US006817156B2

(12) United States Patent
Mok

(10) Patent No.: US 6,817,156 B2
(45) Date of Patent: Nov. 16, 2004

(54) DEVICE FOR POSITIONING CAST-IN U-CHANNELS IN CONCRETE STRUCTURE

(76) Inventor: Chiu Pang Mok, Flat 1303, Block D, Healty Gardens, 560 King's Road, North Point (HK)

( * ) Notice: Subject to any disclaimer, the term of this patent is extended or adjusted under 35 U.S.C. 154(b) by 37 days.

(21) Appl. No.: 10/232,694

(22) Filed: Sep. 3, 2002

(65) Prior Publication Data

US 2004/0040251 A1 Mar. 4, 2004

(51) Int. Cl.[7] .................................... F16G 11/00

(52) U.S. Cl. .......................... 52/699; 52/677; 52/685; 52/710

(58) Field of Search .......................... 52/677, 684, 685, 52/699, 701, 710; 24/279, 285, 459; 403/398; 248/68.1, 74.1

(56) References Cited

U.S. PATENT DOCUMENTS 2,345,650 A * 4/1944 Attwood .................... 403/21
3,005,292 A * 10/1961 Reiland ...................... 52/99
3,181,276 A * 5/1965 Ballou ........................ 52/701
3,370,815 A * 2/1968 Opperthauser ............ 248/74.2
3,861,096 A * 1/1975 Emmons ...................... 52/98
4,073,114 A 2/1978 Irish
4,130,977 A * 12/1978 Taylor et al. ............... 52/710
4,516,296 A * 5/1985 Sherman ..................... 24/279
4,708,554 A * 11/1987 Howard ...................... 411/84
4,718,212 A 1/1988 Illich
4,835,933 A * 6/1989 Yung .......................... 52/685
6,105,216 A * 8/2000 Opperthauser .............. 24/459
6,305,650 B1 * 10/2001 Hawkins et al. .......... 248/68.1

FOREIGN PATENT DOCUMENTS

GB 2243396 10/1991

OTHER PUBLICATIONS

Unistrut Support Solutions, General Engineering Catalogue 9th Edition, Jun. 1998.

* cited by examiner

*Primary Examiner*—Carl D. Friedman
*Assistant Examiner*—Basil Katcheves
(74) *Attorney, Agent, or Firm*—Burns, Doane, Swecker & Mathis, L.L.P.

(57) ABSTRACT

A device (10) for positioning a U-channel (20) in a concrete structure, the device (10) including an attachment tube (22) to be secured to two reinforcement bars (80) of the concrete structure, and a body (12) housing two coil springs (7), the body (12) including an upper part (14) and a lower part (16) which are biased away from each other by the springs (7) and the lower part (16) is engageable with the U-channel (20).

12 Claims, 17 Drawing Sheets

Fig. 9F(iii)

DEVICE FOR POSITIONING CAST-IN U-CHANNELS IN CONCRETE STRUCTURE

BACKGROUND OF THE INVENTION

Cast-in U-channels are now commonly used in the construction industry, in particular for allowing such components as mounting brackets or hangers to be installed along the U-channels. During construction of, e.g. concrete walls, such U-channels are pre-installed at and tied to appropriate locations of reinforcement bars. A steel sliding formwork is then positioned against the U-channels to form a cavity in which concrete is poured. However, if the U-channels are not properly installed, or not tightly tied to the reinforcement bars, or if the positions of the reinforcement bar grid are not accurate, when concrete is poured into the cavity, the U-channels will be buried beneath the concrete, as shown in the left hand side of FIG. 1A of the attached drawings. Thus, when the concrete is set and the formwork is removed, the U-channels cannot be readily accessed. Workers have to locate the whereabouts of the U-channels and remove the concrete covering the buried U-channels, as shown in the right hand side of FIG. 1A. Such will take considerable time, and will therefore increase the cost and time of construction.

In addition, the U-channels may not be properly oriented relative to the surface of the formwork, so that, when concrete is set and the formwork is removed, and as shown in the left hand side of FIG. 1B, in addition to be buried by the concrete, the U-channel is also slanted relative to the surface of the concrete structure. Even if the concrete covering the U-channel is removed, as shown in the right hand side of FIG. 1B, the U-channel may not be suitable for use at all.

It is thus an object of the present invention to provide a device for positioning a U-channel in a concrete structure in which the aforesaid shortcomings are mitigated or at least to provide a useful alternative to the public.

It is a further object of the present invention to provide a device for positioning a U-channel in a concrete structure which is adapted to bias the U-channel against the surface of the formwork facing the U-channel during formation of the concrete structure.

It is a yet further object of the present invention to provide a device for positioning a U-channel in a concrete structure which is adapted to bias the U-channel against the surface of the formwork facing the U-channel at a pre-determined orientation during formation of the concrete structure.

SUMMARY OF THE INVENTION

According to the present invention, there is provided a device for positioning at least a U-channel in a concrete structure, said device including an attachment member adapted to be secured to at least a reinforcement bar of the concrete structure; and a body member housing at least a first resilient member, wherein said body member includes a first body part and a second body part which are biased away from each other by said first resilient member, and wherein said second body part is engageable with said U-channel.

BRIEF DESCRIPTION OF THE DRAWINGS

A preferred embodiment of the present invention will now be described, by way of an example only, with reference to the accompanying drawings, in which:

FIG. 9E(ii) is a sectional view taken along the line E—E in FIG. 7 with the attachment tube removed;

FIG. 9F(ii) is a sectional view taken along the line F—F in FIG. 7 when the attachment tube is at its stable position;

FIG. 9F(iii) is a sectional view taken along the line F—F in FIG. 7 when the attachment tube is swivelled to a second side relative to the body;

DETAILED DESCRIPTION OF THE PREFERRED EMBODIMENT

Figure 1A:
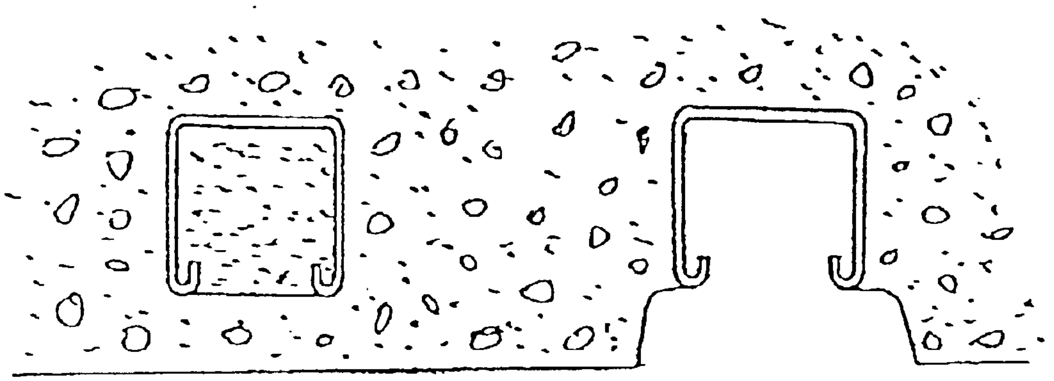
FIG. 1A shows a first way in which cast-in U-channels may be inappropriately positioned in a concrete structure.
Figure 1B:
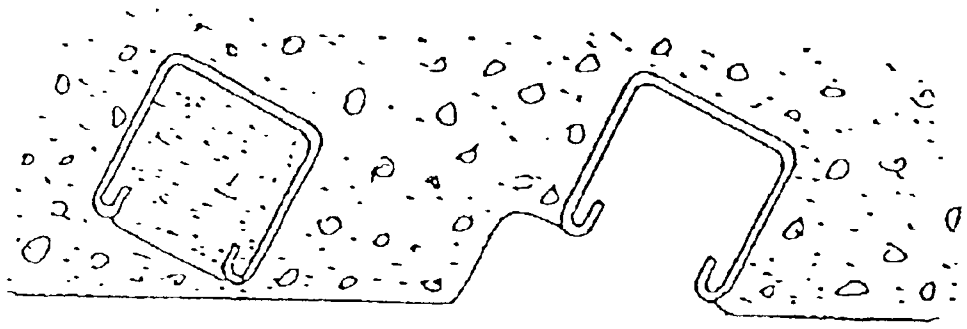
FIG. 1B shows a second way in which cast-in U-channels may be inappropriately positioned in a concrete structure.
Figure 2:
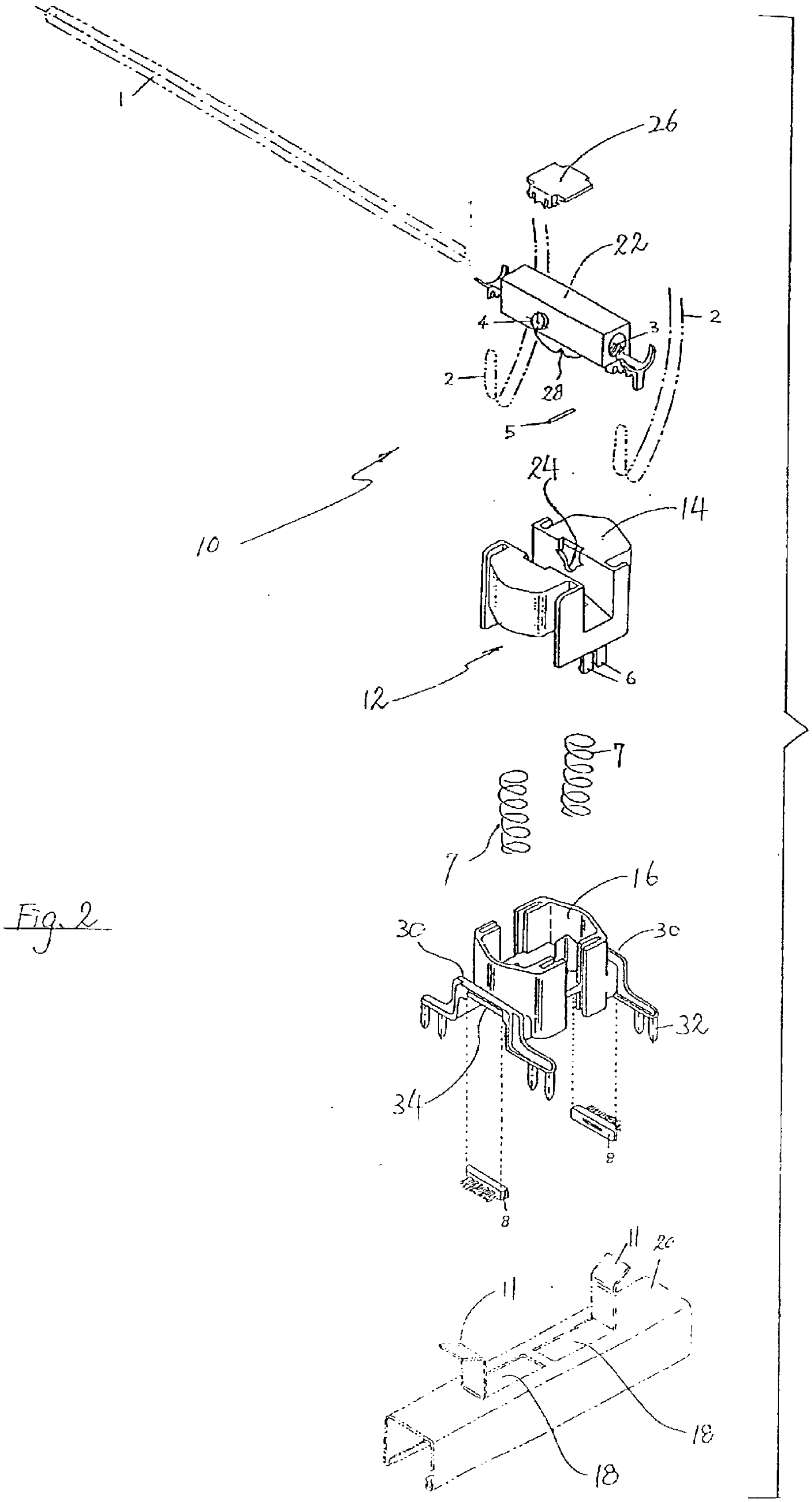
FIG. 2 is a perspective exploded view of a positioning device according to a preferred embodiment of the present invention.
Figure 3:
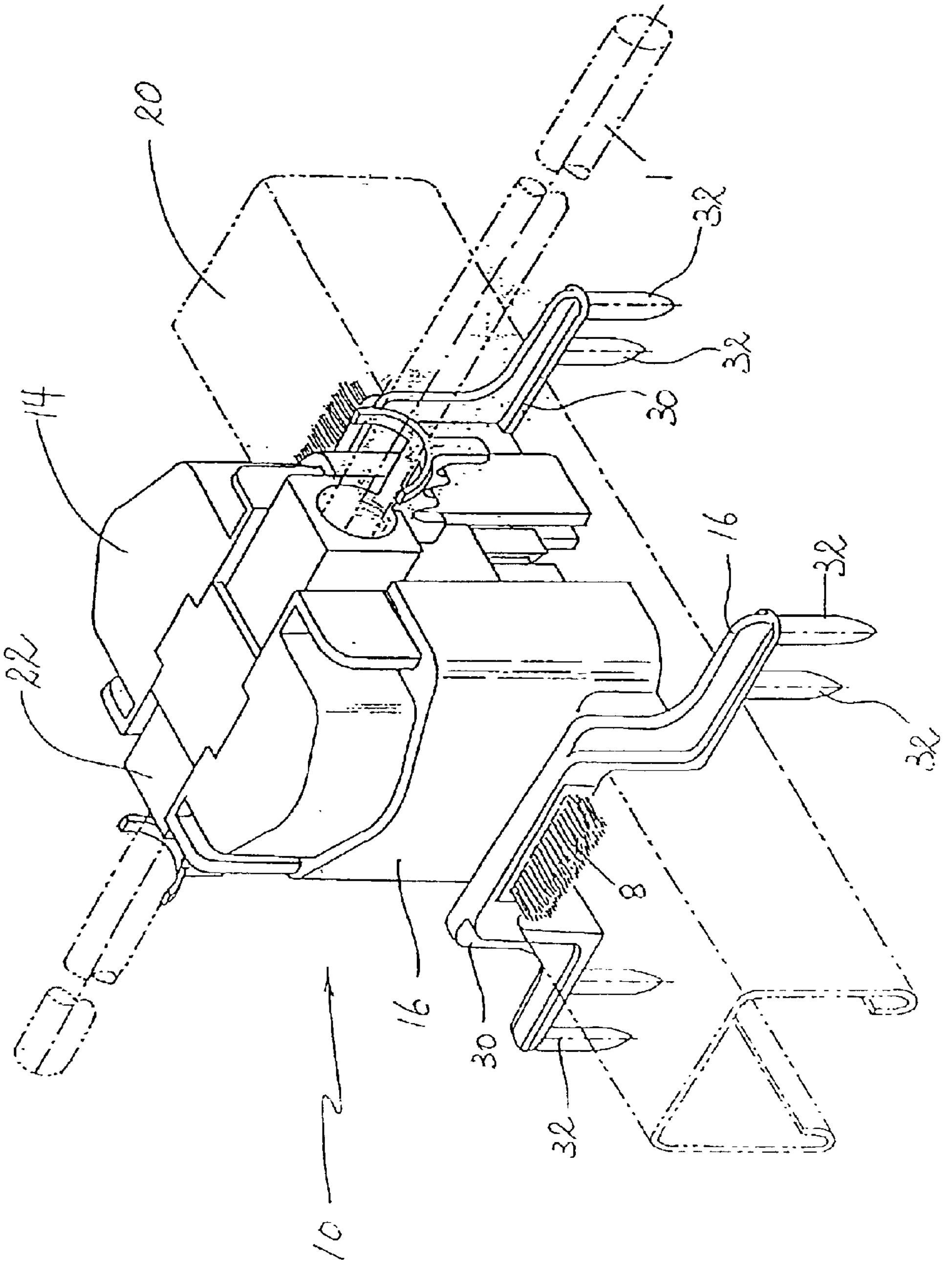
FIG. 3 is a perspective view of the positioning device shown in FIG. 2 as secured to a U-channel.

A positioning device according to a preferred embodiment the present invention is shown in FIGS. 2 and 3, and generally designated as 10. The positioning device 10 includes a body 12 consisting of an upper part 14 and a lower part 16. Positioned between the upper part 14 and lower part 16 are a pair of coil springs 7. The lower part 16 has a number of hooks (not shown in FIG. 2 or 3) for insertion into a hole 18 of a U-channel 20 (shown in dashed lines) for engagement with the U-channel 20 in a snap-fit manner. The upper part 14 includes a number of hooks 6 also for engagement with the U-channel 20. When both the upper part 14 and the lower part 16 are engaged with the U-channel 20, the upper part 14 may be moved relative to the U-channel 20 as well as the lower part 16. The U-channel 20 includes a number of wall ties 11 for better securing the U-channel 20 in concrete.

The device 10 includes an attachment tube 22 with a longitudinal through-hole 3 for receiving a steel rod 1. The steel rod 1 (shown here in dashed lines), when received within the through-hole 3, may be tied to, and thus fixed with, the attachment tube 22 by a number of steel wires 2 (shown in dashed lines). The attachment tube 22 includes two pivots stud 4 (of which only one is shown in FIG. 2) each to be received within a recess 24 in the upper part 14 of the body 12. The attachment tube 22 is thus allowed to swivel relative to the upper part 14 of the body 12 about the pivot studs 4. When the attachment tube 22 is engaged with the upper part 14, a cover 26 is placed on top of and secured with the upper part 14 to prevent disengagement of the attachment tube 22 from the upper part 14. A resilient spring pin 5 is received within a recess 28 on a curved underside of the attachment tube 22, the function of which will be discussed below.

The lower part 16 includes two legs 30, each on a respective side. Each leg 30 has two pairs of toes 32. Each of the legs 30 has a generally rectangular arch portion 34 for receiving a brush 8, and for receiving the U-channel 20 by abutting three surfaces of the U-channel 20.

Figure 4A:
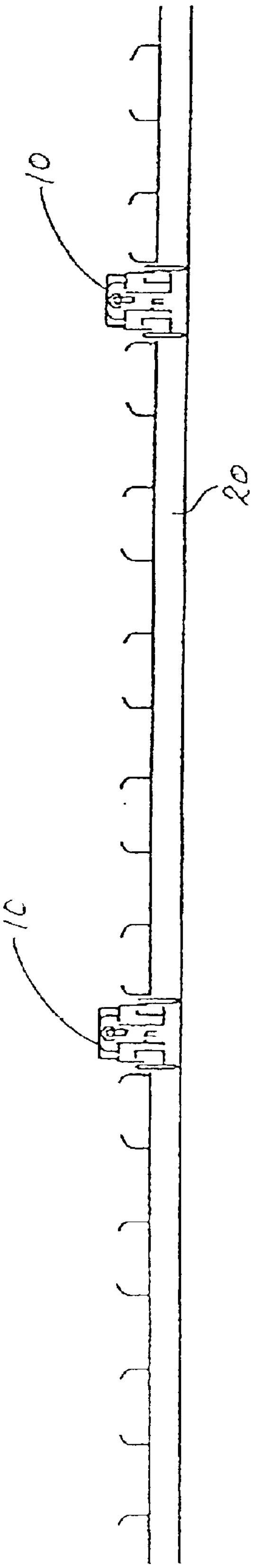
FIG. 4A is a side view showing a U-channel secured with a plurality of the positioning devices shown in FIG. 2.
Figure 4B:
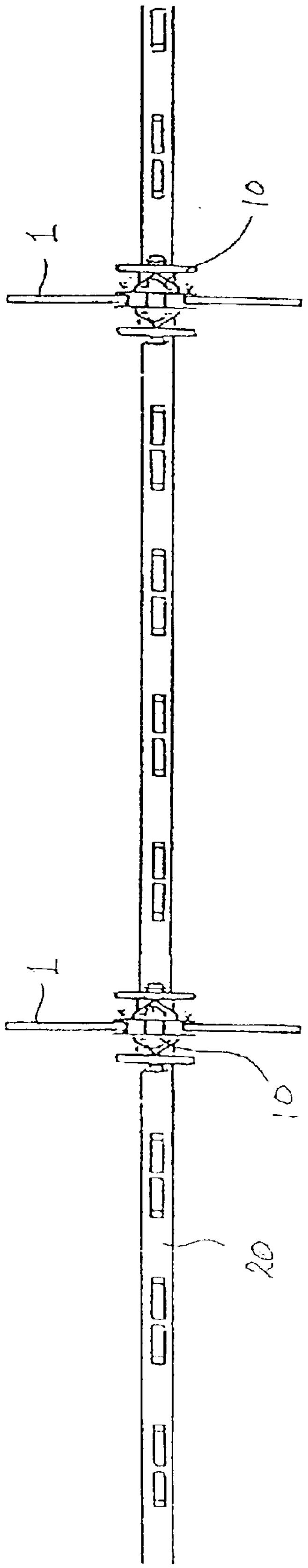
FIG. 4B is a top view of the U-channel shown in FIG. 4A.

As can be seen in FIGS. 4A and 4B, a number of positioning devices 10 may be installed along the length of the U-channel 20, e.g. about one meter apart.

Figure 5:
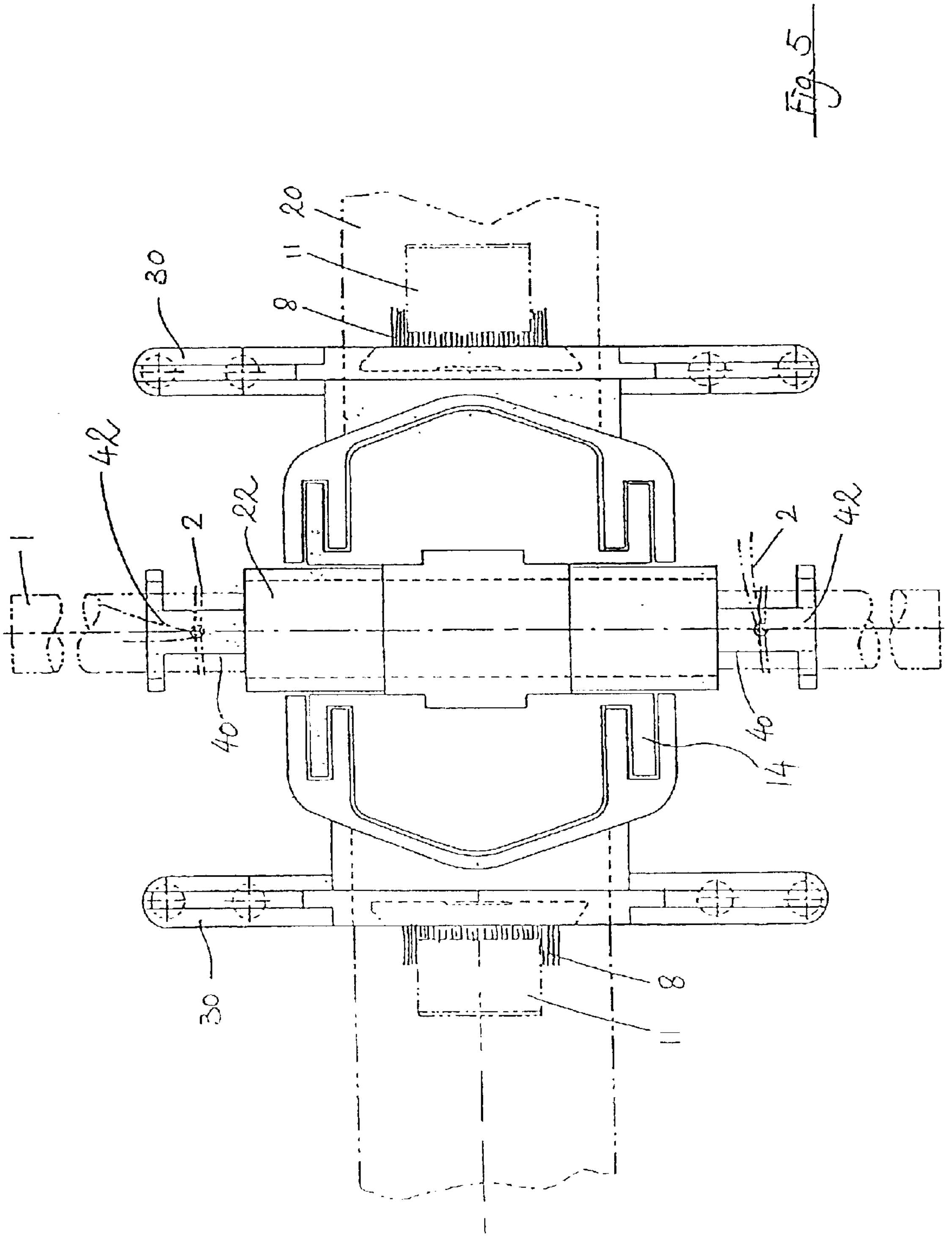
FIG. 5 is a top view of the positioning device shown in FIG. 3.
Figure 6:
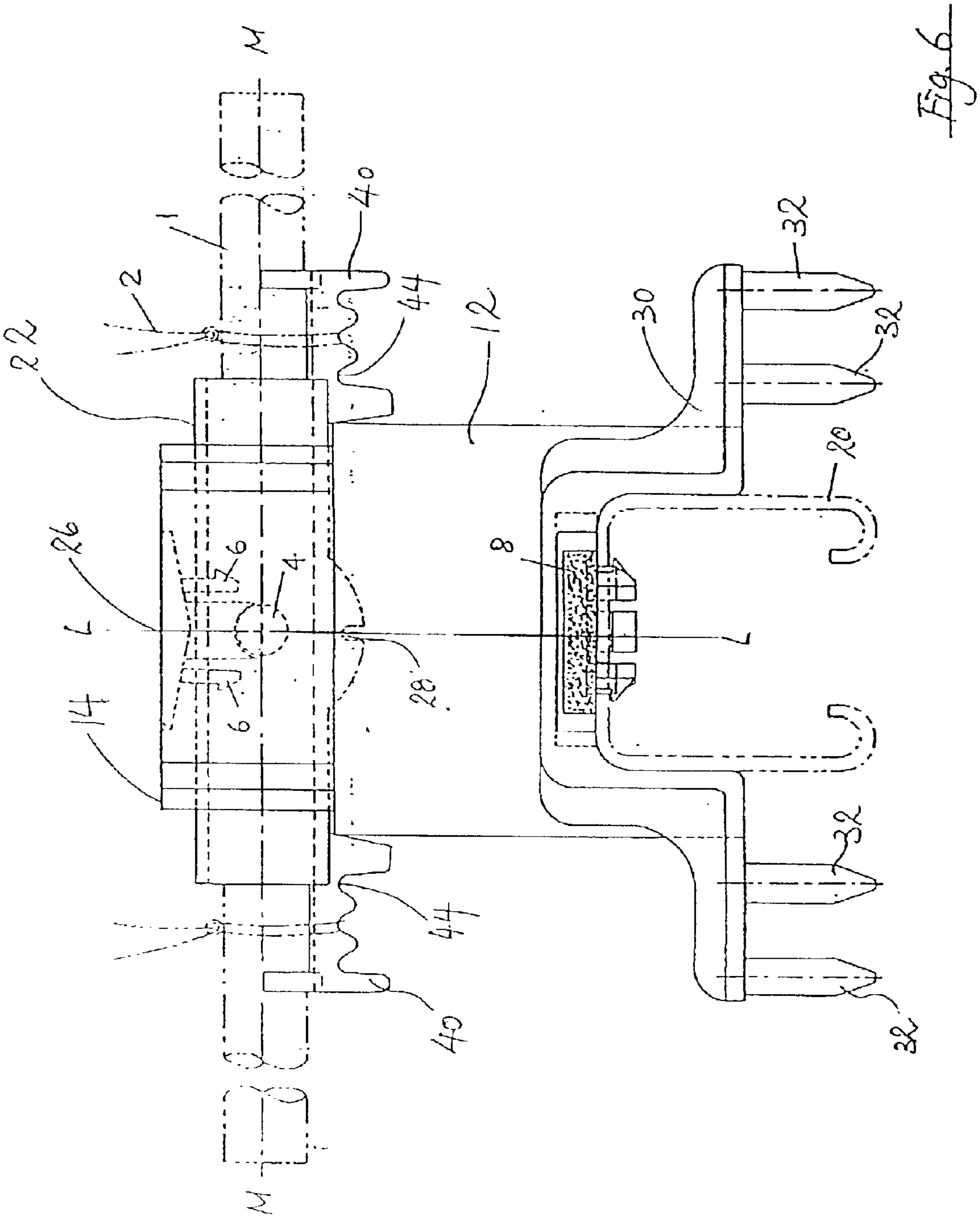
FIG. 6 is a side view of the positioning device shown in FIG. 3.
Figure 7:
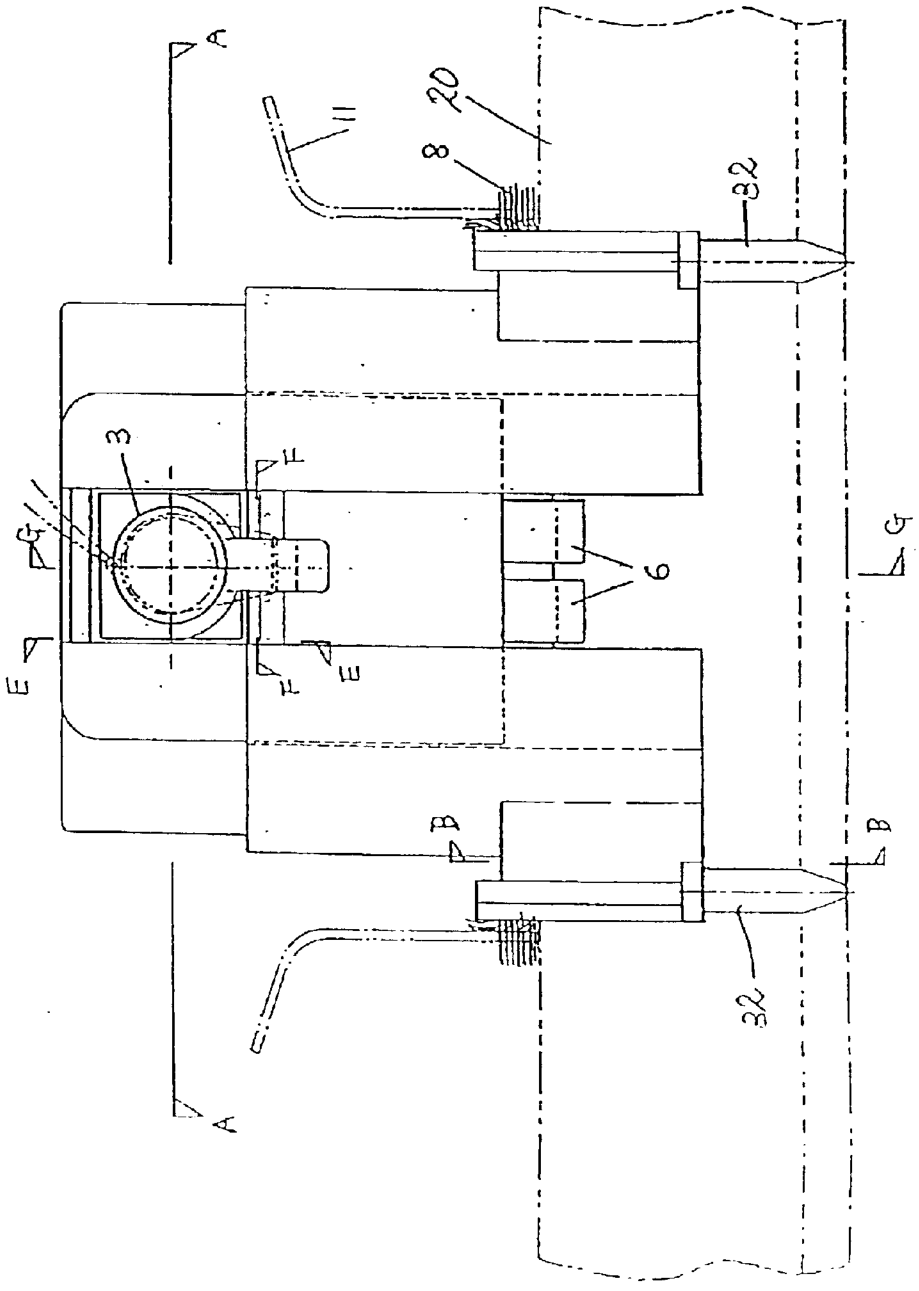
FIG. 7 is a front view of the positioning device shown in FIG. 3.

Turning to FIGS. 5 to 7, it can be seen that, when the positioning device 10 is engaged with the U-channel 20, the brushes 8 are in contact with the wall ties 11 of the U-channel 20, and serve to prevent concrete from entering into the interior of the positioning device 10. As can be seen in FIG. 6, in order to enhance the engagement between the steel rod 1 and the attachment tube 22 of the body 12, there are provided two extensions 40, each having a curved recess 42 for receiving the rod 1. On the lower side of each extension 40 is a wavy portion 44 into which the steel wire 2 may be received for better tying the steel rod 1 with the attachment tube 22. It can also be seen that the cover 26 has two hooks 6 for snap-fitting with the upper part 14 of the body 12. As can be seen more clearly in FIGS. 6 and 7, when the positioning device 10 is installed in the U-channel 20, the toes 32 of the legs 30 are co-terminus with open side of the U-channel 20.

Figure 8:
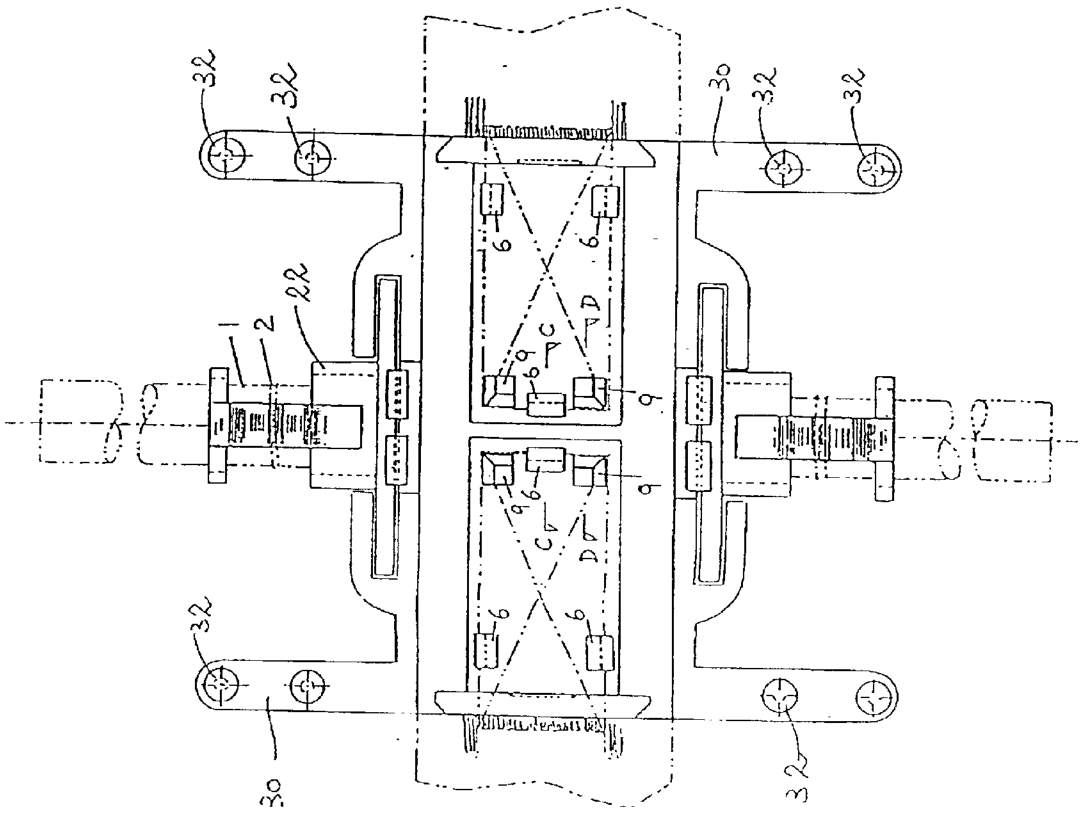
FIG. 8 is a bottom view of the positioning device shown in FIG. 3.

FIG. 8 shows a number of studs 9 extending from the body 12 of the positioning device 10 for engagement with the U-channel 20.

Figure 9A:
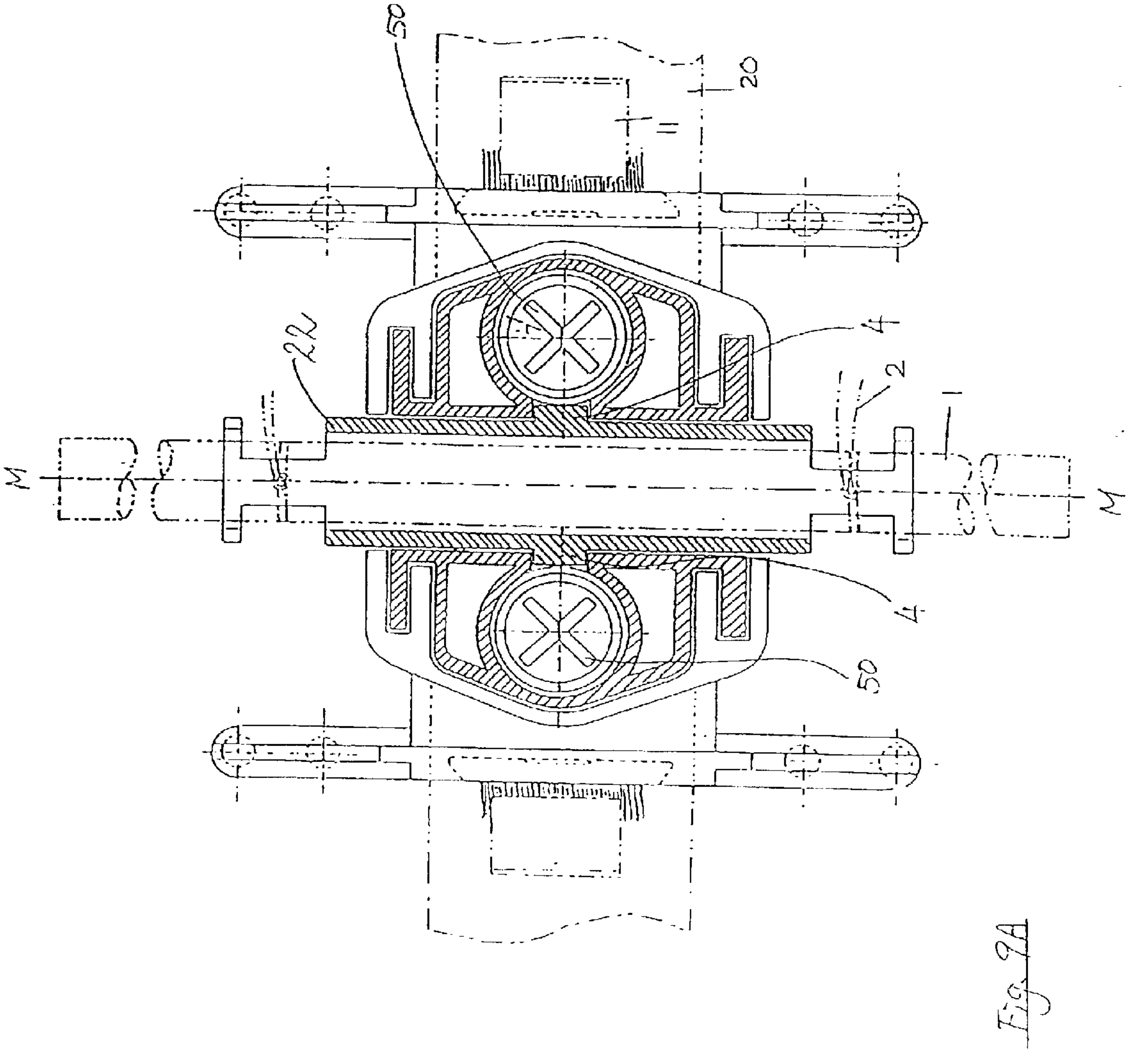
FIG. 9A is a sectional view taken along the line A—A in FIG. 7.

As can be seen in FIG. 9A, when the positioning device 10 is secured to the U-channel 20, the longitudinal axis M—M of the attachment member 22 is perpendicular to the length of the U-channel 20. By reason of the pivot studs 4 of the attachment tube 22 being received within the upper part 14, the attachment tube 22 may be swivelled about the pivot studs 4 relative to the upper part 14 of the body 12.

In addition, extending from a lower surface of the lower part 16 of the body 12 are two generally cross-shaped towers 50 around each of which one of the coil springs 7 is placed.

The arrangement of the body 12 and the springs 7 is such that the springs 7 always exert a biasing force on the body parts 14, 16 which pushes them away from each other, even when they are furthest apart from each other as allowed by the engagement between the upper part 14 and the U-channel 20.

Figure 9E:
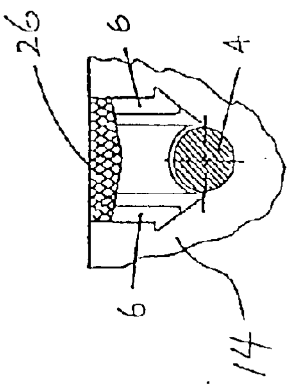
FIG. 9E(i) is a sectional view taken along the line E—E in FIG. 7 with the attachment tube engaged.
Figure 9F:
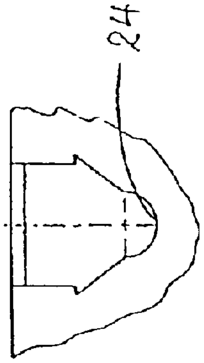
FIG. 9F(i) is a sectional view taken along the line F—F in FIG. 7 when the attachment tube is swivelled to a first side relative to the body.
Figure 9F:
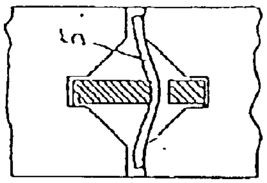
Figure 9B:
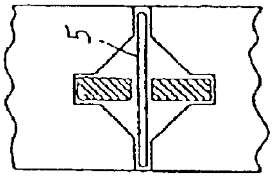
FIG. 9B is a sectional view taken along the line B—B in FIG. 7.
Figure 9B:
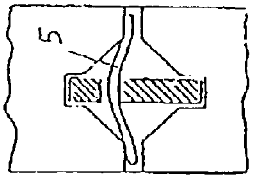
Figure 9B:
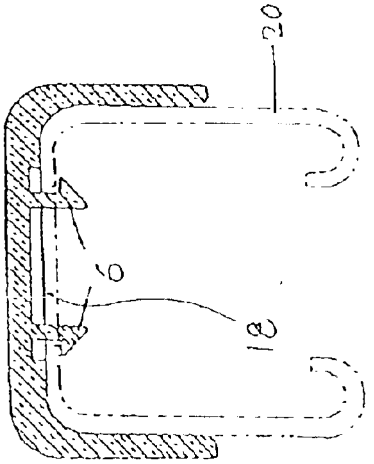
Figure 9D:
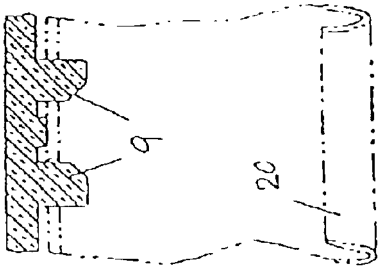
FIG. 9D is a sectional view taken along the line D—D in FIG. 8.
Figure 9C:
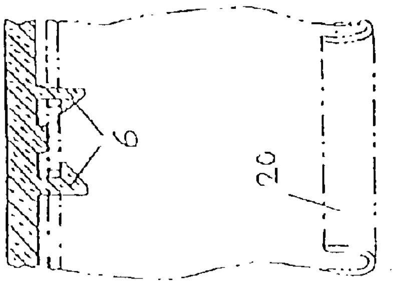
FIG. 9C is a sectional view taken along the line C—C in FIG. 8.

FIG. 9B shows hooks 6 of the lower part 16 as being received within the holes 18 of the U-channel 20 for inter-engagement between the lower part 16 and the U-channel 20. As to FIGS. 9C and 9D, such show, respectively, engagement of hooks 6 and studs 9 with the U-channel 20. FIGS. 9E(i) and 9E(ii) show the engagement of the pivot stud 4 in the recess 24 of the upper part 14 of the body 12, and the engagement of the cover 26 onto the upper part 14.

Turning to FIGS. 9F(i), 9F(ii) and 9F(iii), such show the states and shapes of the spring pin 5 when the attachment tube 22 is at different positions relative to the body 12. In particular, and referring back to FIG. 6, when the longitudinal axis M—M of the attachment member 22 is perpendicular to the longitudinal axis L—L of the body 12, the spring pin 5 will be in its stable configuration as shown in FIG. 9F(ii). However, when the attachment member 22 is tilted so that it is inclined upward to the right, the position of the recess 28 will also swivel and move the middle part of the spring pin 5 to the right to the position as shown in FIG. 9F(i), in which case the spring pin 5 will bias the attachment rod 22 to return to the position as shown in FIG. 6. Similarly, when the attachment member 22 is tilted so that it is inclined upward to the left, the position of the recess 28 will also swivel and move the middle part of the spring pin 5 to the left, to the position as shown in FIG. 9F(iii), in which case the spring pin 5 will also bias the attachment rod 22 to return to the position as shown in FIG. 6. By way of such an arrangement, the body 12 and the attachment rod 22 are always biased towards a relative position in which the longitudinal axis M—M of the attachment member 22 is perpendicular to the longitudinal axis L—L of the body 12. Such will thus ensure that the U-channel 20 to which the positioning device 10 is secured is positioned at a particular orientation relative to the attachment member 22.

Figure 10:
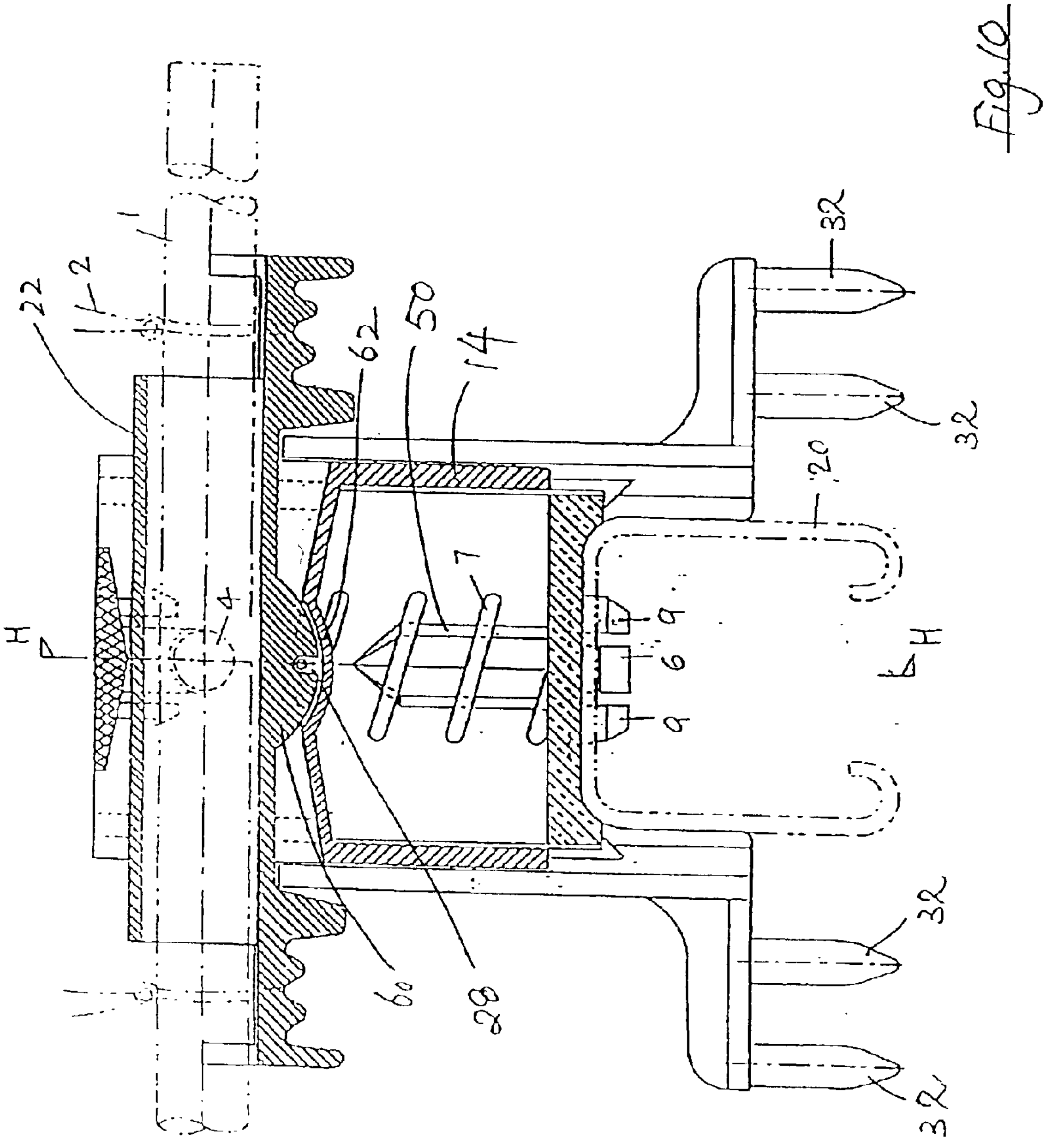
FIG. 10 is a sectional view taken along the line G—G in FIG. 7.
Figure 11:
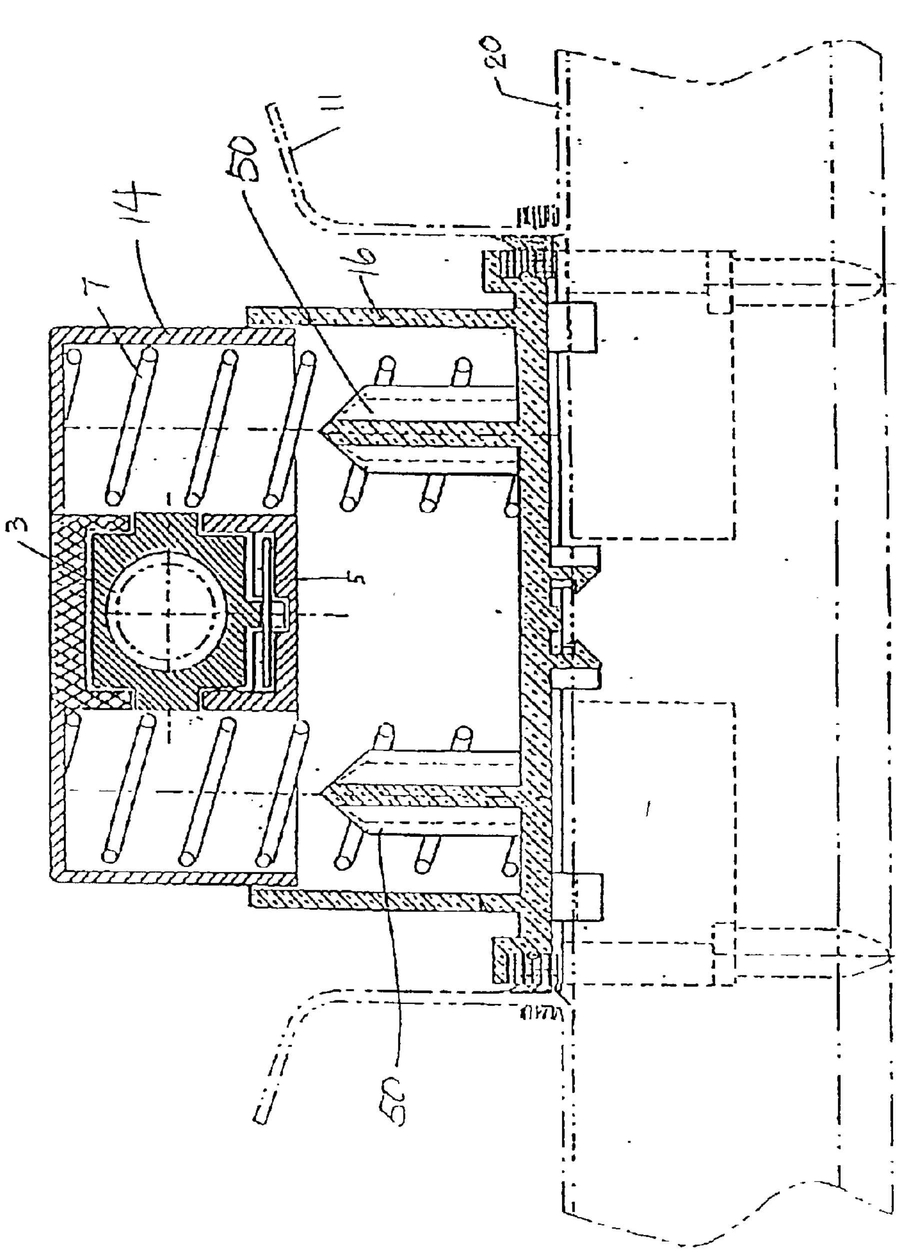
FIG. 11 is a sectional view taken along the line H—H in FIG. 10.
Figure 12:
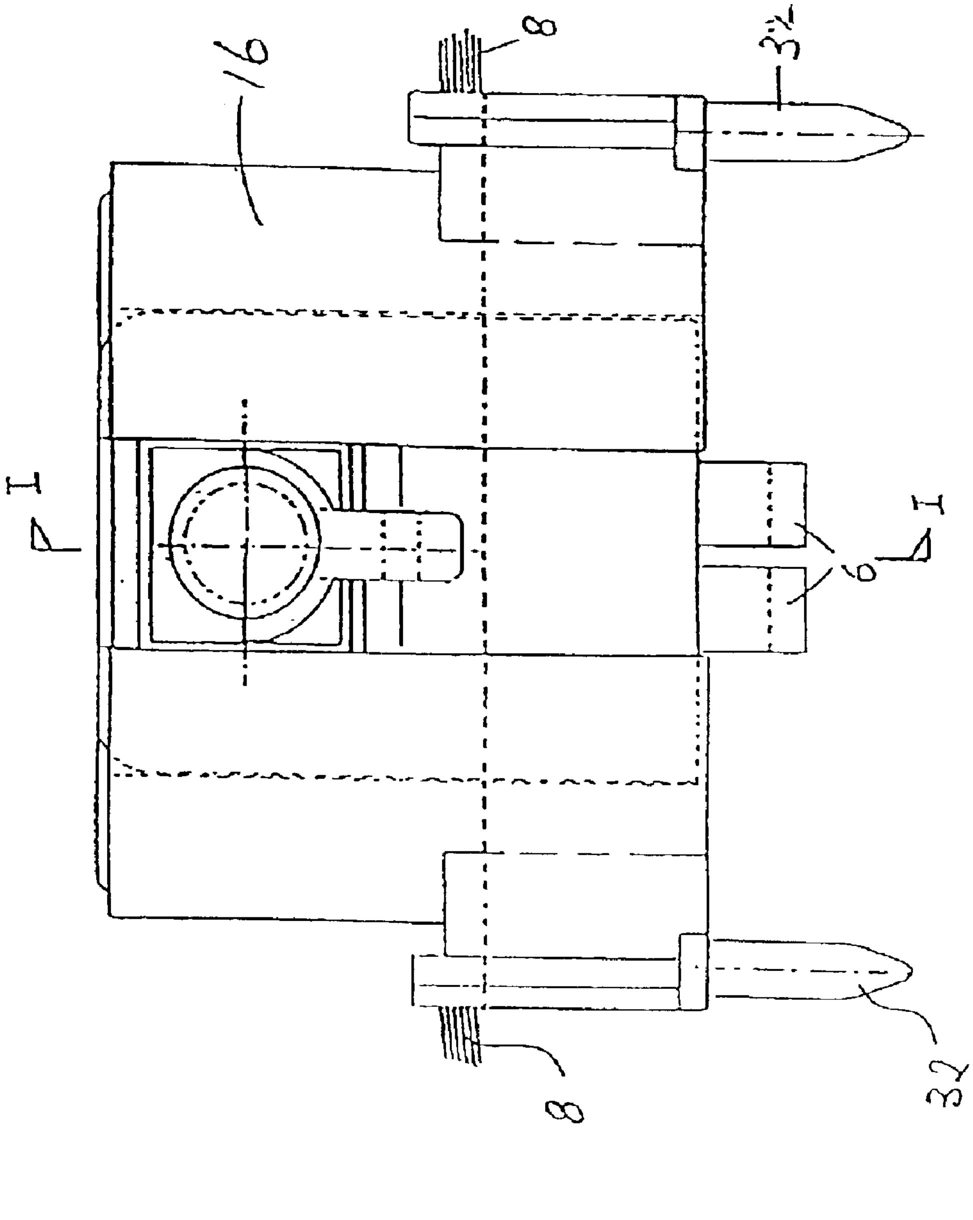
FIG. 12 is a front view of the positioning device shown in FIG. 7 in a compressed configuration.

As can be seen in FIGS. 10 and 11, the coil spring 7 is placed around the cross-shaped tower 50. On a lower side of the attachment tube 22 is a part-circular extension 60, which defines the recess 28. The part-circular extension 60 is received in part in a complementarily shaped and sized recess 62 for allowing smooth swivelling movement of the attachment tube 22 relative to the upper part 14 of the body 12.

Figure 13:
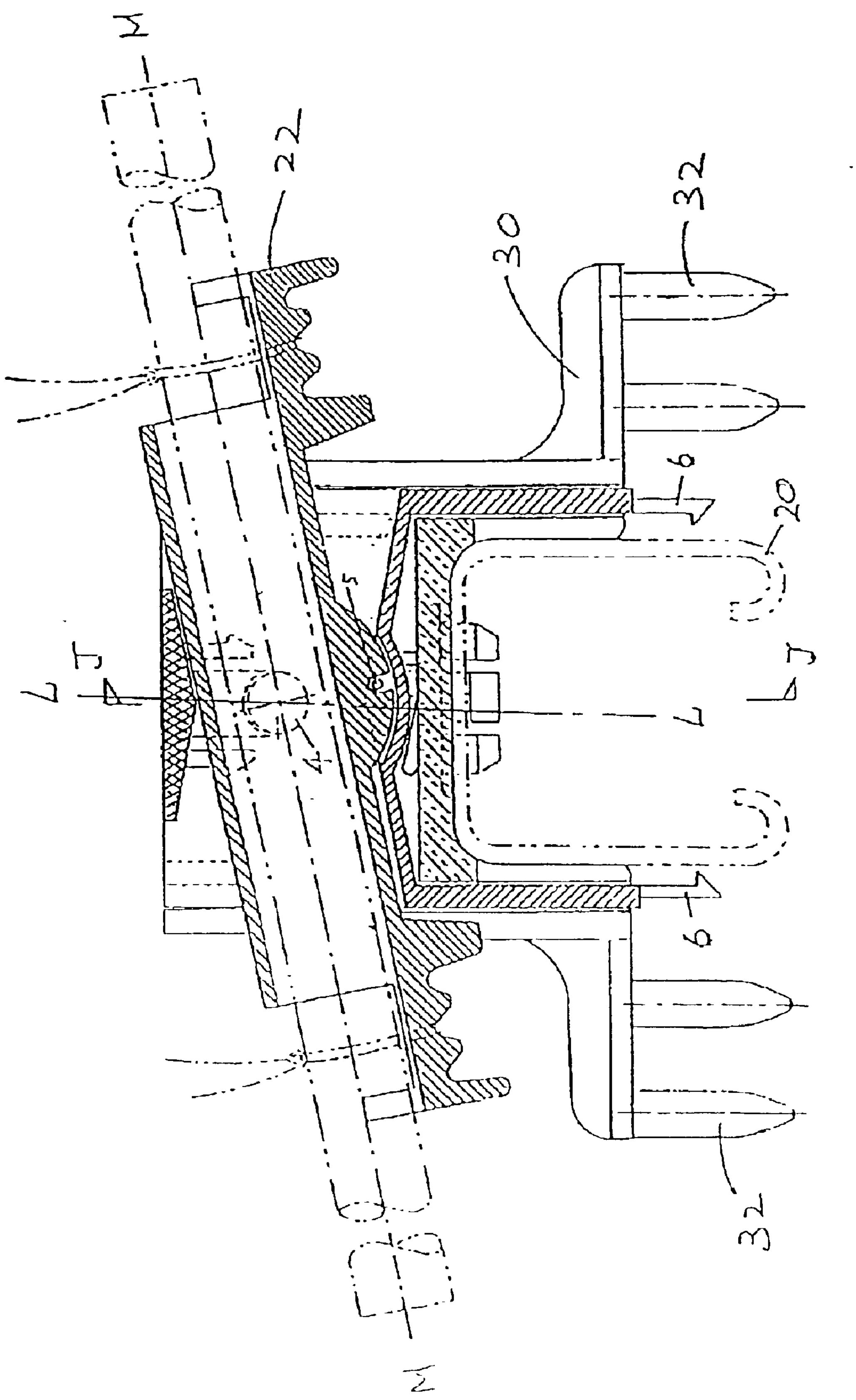
FIG. 13 is a sectional view taken along the line I—I in FIG. 12, in which the attachment tube is swivelled to a first side relative to the body.
Figure 14:
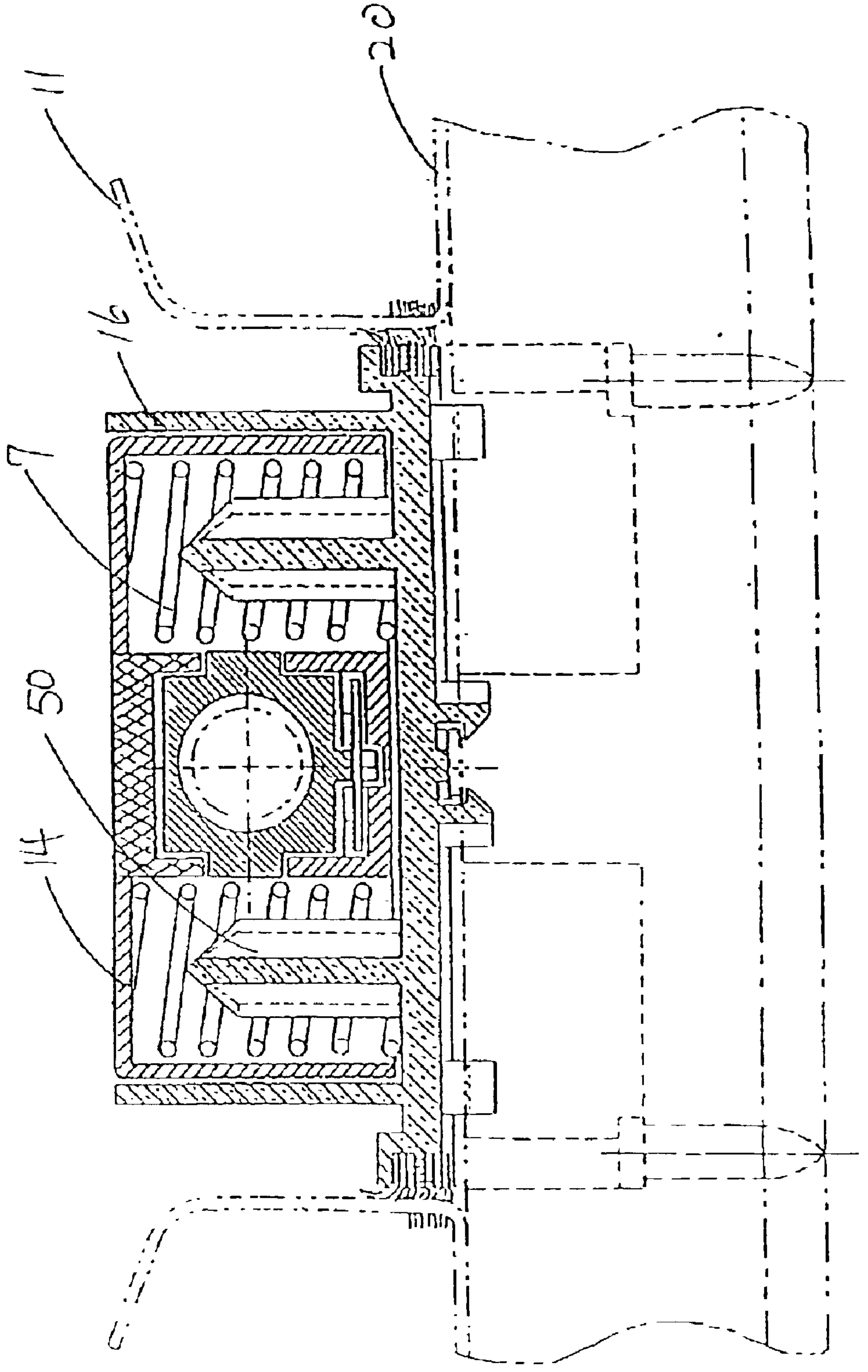
FIG. 14 is a sectional view taken along the line J—J in FIG. 13.
Figure 15:
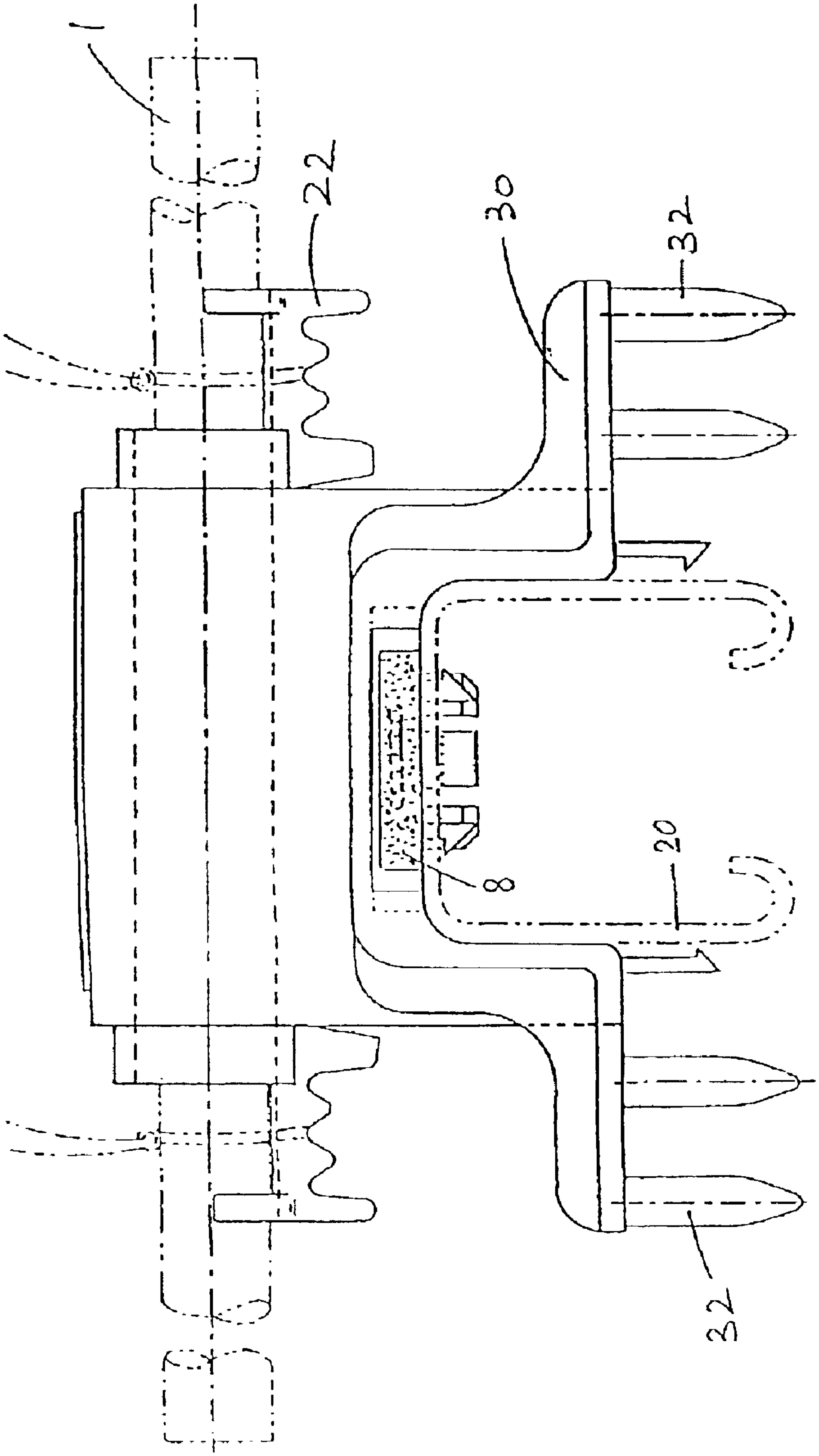
FIG. 15 is a side view of the positioning device shown in FIG. 6 in a compressed configuration.

As can be seen in FIG. 11, the upper part 14 of the body 12 may be moved closer to the lower part 16 against the biasing force of the springs 7, to the position as shown in FIGS. 12 to 15, in which the body 12 is in a compressed configuration. FIG. 13 also shows the attachment tube 22 in a position in which its longitudinal axis M—M is not perpendicular to the longitudinal axis L—L of the body 12. As discussed above, in such a situation, the attachment tube 22 is biased towards a position in which its longitudinal axis M—M is perpendicular to the longitudinal axis L—L of the body 12.

Figure 16A:
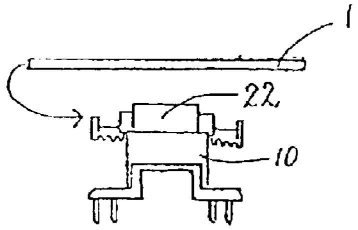
FIGS. 16A to 16H show the steps in which a U-channel is positioned in a concrete structure by the positioning device shown in FIG. 2.
Figure 16E:
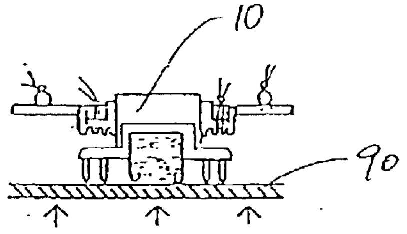
Figure 16B:
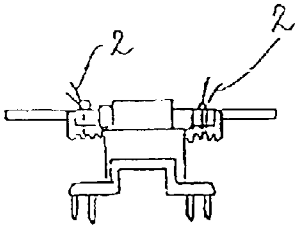
Figure 16F:
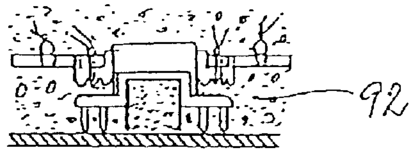
Figure 16C:
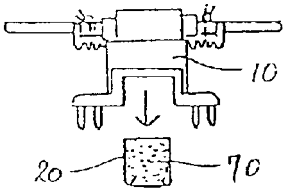

Turning to FIGS. 16A to 16H, such show the steps in which the U-channel 20 is positioned in a concrete structure by the positioning device 10. As shown in particular in FIG. 16A, the steel rod 1 is received within the hole 3 of the positioning device 10, and to be fixedly tied to the attachment tube 22 of the body 12 by two steel wires 2, as shown in FIG. 16B. The U-channel 20 is then received within the respective arch portion 34 of the respective legs 30 for engagement with the positioning device 10, as shown in FIG. 16C. The space in the U-channel 20 is filled with polystyrene 70 provided by the manufacturer.

Figure 16G:
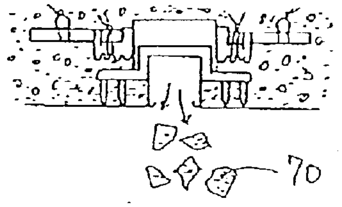
Figure 16D:
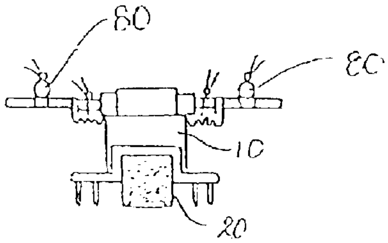
Figure 16H:
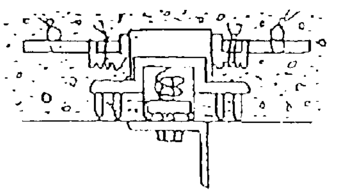

The device 10 is then fixed to an appropriate location, by having the steel rod 1 tied to two parallel reinforcement bars 80, as shown in FIG. 16D, so as to position the engaged U-channel 20 to an appropriate location relative to the reinforcement bars 80. A sliding formwork 90 is then pressed against the U-channel 20 to form a cavity. Because of the biasing force of the springs 7 in the device 10, the lower part 16 of the body 12 is pressed against the formwork 90. As a result, the U-channel 20 is also pressed against the formwork 90. In addition, as can be seen in FIG. 16E, all the toes 32 of the legs 30 would abut the inner surface of the formwork 90, thus preventing tilting of the U-channel 20 relative to the surface of the formwork 90. As shown in FIG. 16F, concrete 92 is then poured into cavity. After the concrete 92 is set, the formwork 90 is removed. The polystyrene 70 is then removed from the cast-in U-channel 20, as shown in FIG. 16G. The cast-in U-channel 20 is then ready for use, as shown in FIG. 16H.

It should be understood that the above only illustrates an example whereby the present invention may be carried out, and that various modifications and/or alterations may be made thereto without departing from the spirit of the invention.

It should also be understood that various features of the invention which are now, for brevity, described in the context of a single embodiment, may be provided separately or in any appropriate sub-combinations.

What is claimed is:

1. A device for positioning at least a U-channel in a concrete structure, said device including:

an attachment member that includes a channel for receiving a rod adapted to be secured to at least a reinforcement bar of the concrete structure; and a body member housing at least a first resilient member, wherein said body member includes a first body part and a second body part which are biased away from each other by said first resilient member, and wherein said second body part is engageable with said U-channel.

2. A device according to claim 1 wherein said first and second body parts are movable relative to each other.

3. A device according to claim 1 wherein said resilient member is positioned in a cavity defined by said first and second body parts.

4. A device according to claim 1 wherein said second body part includes at least a hook member for engagement with said U-channel by snap-fitting.

5. A device according to claim 1 wherein said first body part is adapted to be movable relative to said U-channel.

6. A device according to claim 1 wherein said attachment member is pivotally engaged with said body member.

7. A device according to claim 6 wherein said attachment member is pivotally engaged with said first body part of said body member.

8. A device for positioning at least a U-channel in a concrete structure, said device including:

an attachment member adapted to be secured to at least a reinforcement bar of the concrete structure; and a body member housing at least a first resilient member comprising a coil spring, wherein said body member includes a first body part and a second.

9. A device for positioning at least a U-channel in a concrete structure, said device including:

an attachment member adapted to be secured to at least a reinforcement bar of the concrete structure; and a body member housing at least a first resilient member wherein each of said body member and attachment member comprises a respective longitudinal axis, and wherein said body member includes a first body part and a second body part which are biased away from each other by said first resilient member and wherein said second body part is engageable with said U-channel, and further including a second resilient member adapted to bias said body member and attachment member to assume a relative position in which said longitudinal axis of said body member is substantially perpendicular to said longitudinal axis of said attachment member.

10. A device according to claim 9 wherein said second resilient member comprises a spring pin.

11. A device for positioning at least a U-channel in a concrete structure, said device including:

an attachment member adapted to be secured to at least a reinforcement bar of the concrete structure; and a body member housing at least a first resilient member wherein said body member includes a first body part and a second body part which are biased away from each other by said first resilient member, and wherein said second body part includes at least one leg member that is contoured to receive at least part of said U-channel and has at least a brush member adapted to abut said U-channel.

12. A device according to claim 11 wherein each said leg member includes a plurality of toe members which are adapted to abut a formwork.

* * * * *